United States Patent [19]
Bach et al.

[11] Patent Number: 5,683,585
[45] Date of Patent: Nov. 4, 1997

[54] PROCESS FOR THE REMOVAL OF ORGANIC SOLVENTS FROM WASTE WATER

[75] Inventors: Hanswilhelm Bach, Duisburg; Helmut Bahrmann, Hamminkeln; Jürgen Weber, Oberhausen, all of Germany

[73] Assignee: Hoechst Aktiengesellschaft, Germany

[21] Appl. No.: 631,911

[22] Filed: Apr. 12, 1996

Related U.S. Application Data

[63] Continuation of Ser. No. 345,474, Nov. 28, 1994, abandoned.

[30] Foreign Application Priority Data

Dec. 2, 1993 [DE] Germany .................. 43 41 014.6

[51] Int. Cl.$^6$ ...................................... B01D 11/00
[52] U.S. Cl. .................. 210/634; 210/511; 210/751
[58] Field of Search ...................... 210/634, 511, 210/751, 712, 642; 134/10, 38

[56] References Cited

U.S. PATENT DOCUMENTS

| | | | |
|---|---|---|---|
| 3,898,291 | 8/1975 | Darsi et al. | 210/511 X |
| 4,149,968 | 4/1979 | Kupiec et al. | 210/751 X |
| 4,692,432 | 9/1987 | Tedder | 568/916 |
| 4,770,780 | 9/1988 | Moses | 210/634 |

FOREIGN PATENT DOCUMENTS

| | | | |
|---|---|---|---|
| 2319585 | 7/1975 | France | 210/634 |
| 0030164 | 3/1978 | Japan | 210/634 |

*Primary Examiner*—Ana Fortuna
*Attorney, Agent, or Firm*—Bierman, Muserlian and Lucas LLP

[57] ABSTRACT

Wastewaters resulting from preparation or use of paints comprising organic solvents are purified by extraction with higher monoalcohols, i.e. alcohols having at least 8 carbon atoms in the molecule.

5 Claims, No Drawings

PROCESS FOR THE REMOVAL OF ORGANIC SOLVENTS FROM WASTE WATER

This application is a continuation of application Ser. No. 08/345,474, filed Nov. 28, 1994, now abandoned.

This Application claims the benefit of the priority of German Application P 43 41 014.6, filed Dec. 2, 1993.

The invention relates to a process for the purification of wastewaters which result from the preparation or use of paints containing organic solvents.

BACKGROUND OF THE INVENTION

Paints are complex mixtures of volatile and non-volatile constituents. The non-volatile components include, inter alia, dyestuffs, pigments, film-forming agents, resins, and plasticizers. Volatile components are the solvents, which evaporate out of the coating composition during film formation, macromolecular substances, or precursors of these substances. The solvents dissolve the solid or viscous binder components and influence the viscosity of the paint so that it has the consistency appropriate for the particular intended use.

New developments have been directed to the preparation of solvent-free and low-solvent paints. Nonetheless, even today, it has not yet been possible to dispense with the addition of solvents to paint formulations in many cases. The nature of the solvents depends on the composition of the paints. Those used most include aliphatic monoalcohols, in particular alcohols having 3 to 5 carbon atoms, for example propanol or butanol, and esters of lower aliphatic monoalcohols with lower monocarboxylic acids, for example butyl acetate.

In wastewaters, the solvents result in an increase in the COD (chemical oxygen demand) value. This is the amount of potassium dichromate, expressed as the oxygen equivalent, consumed by the oxidizable contents of one liter of water. The COD value is determined by a standardized procedure described, for example, in Ullmanns Encyclopädie der technischen Chemie (Ullmann's Encyclopedia of Industrial Chemistry), 4th Edition (1981), Volume 6, pages 376 et seq.

Before wastewater can be sent to conventional purification plants or discharged into rivers or other water receivers, its content of organic impurities must be decreased considerably to meet the strict legal requirements as to the maximum permitted concentration of harmful substances.

Thus, the object of the invention is to provide a process whereby the concentration of organic impurities in wastewater from paint production and paint use can be decreased.

SUMMARY OF THE INVENTION

This object is achieved by a process which comprises extracting the wastewaters with monoalcohols which contain 8 or more carbon atoms in the molecule. The novel process can be carried out in an industrially simple manner, is easily adapted to various circumstances, and is economical and efficient. It allows 90% or more of the organic impurities contained in the wastewater to be removed.

DETAILED DESCRIPTION OF THE INVENTION

Extraction agents which are useful in the inventive process are the higher monoalcohols, i.e. those having 8 or more carbon atoms in the molecule. Aliphatic alcohols having 8 to 16 carbon atoms are preferred. They can be straight or branched chain, saturated or unsaturated. It is not necessary to use pure alcohols; mixtures of isomeric alcohols or of alcohols of different molecular size are also operative. 2-Ethylhexanol, 3,5,5-trimethylhexanol, isooctyl alcohol, nonyl alcohol, decyl alcohol and isodecyl alcohol and the mixtures of isomeric $C_8$-, $C_9$- and $C_{10}$-alcohols, in particular 2-ethylhexanol, have proven to be suitable.

The extraction of the organic impurities from wastewater by the process of the invention is carried out in the devices customary for solvent extraction. Useful extractors include those which are constructed in one or more stages as extraction batteries comprising several mixer/separator pairs connected in series. Extraction columns with static baffles, such as packed columns, or with moving baffles, such as stirred columns, can likewise be used, the extraction agent and carrier liquid being passed concurrently, or, preferably, counter-currently. The process is usually carried out under normal pressure and temperature conditions. The extraction agent can be regenerated in a simple manner by distillation and can therefore be employed repeatedly.

The novel process allows purification of wastewater from paint production and paint use by means of the solvents of the type mentioned, regardless of the other constituents of the paints. The best mode of practicing the novel process is set forth in the following example, but the invention is not limited to the embodiment described.

EXAMPLE 100 g of a solution of 0.58 g of n-butyl acetate, 0.70 g of n-butanol, and 0.71 g of n-propanol in 98.01 g of water is extracted intensively with 100 g of 2-ethylhexanol at room temperature for a period of 5 minutes in a 500 ml separating funnel. Thereafter, the aqueous and organic phases separate within 1 minute.

The organic phase, analyzed by gas chromatography, comprises 0.556 g of n-butyl acetate, 0.628 g of n-butanol and 0.494 g of n-propanol, i.e. 95.9% of butyl acetate, 89.7% of n-butanol, and 69.6% of propanol are removed from the aqueous solution.

Although only a limited number of specific embodiments of the present invention have been expressly disclosed, it is, nonetheless, to be broadly construed, and not to be limited except by the character of the clams appended hereto.

What we claim is:

1. A process for purification of wastewaters containing paint as well as substantial amounts of monoalcohols having 3 to 5 carbon atoms and esters thereof with lower monocarboxylic acids, comprising extraction of said wastewater with a monoalcohol having at least 8 carbon atoms.

2. The process of claim 1 wherein said alcohol has 8 to 16 carbon atoms.

3. The process of claim 1 wherein said alcohol is selected from the group consisting of 2-ethylhexanol; 3,5,5-trimethyl hexanol; isooctyl alcohol; nonyl alcohol; decyl alcohol; isodecyl alcohol; and mixtures of octyl, nonyl, and decyl alcohols and isomers thereof.

4. The process of claim 3 wherein said alcohol is 2-ethyl hexanol.

5. The process of claim 1 wherein said purification is carried out with agitation.

* * * * *